United States Patent Office

Re. 27,280
Reissued Feb. 15, 1972

27,280

PRODUCTION OF SEMIPERMEABLE MEMBRANES

Serop Manjikian, Del Mar, Calif., assignor to Universal Water Corporation, Del Mar. Calif.

No Drawing. Original No. 3,483,282, dated Dec. 9, 1969, Ser. No. 692,307, Dec. 21, 1967, which is a continuation-in-part of Ser. No. 614,398, Feb. 7, 1967. Application for reissue July 15, 1970, Ser. No. 55,296
Int. Cl. B01d *39/18;* B29d *7/02;* B29h *7/20*
U.S. Cl. 264—41 9 Claims

Matter enclosed in heavy brackets [ ] appears in the original patent but forms no part of this reissue specification; matter printed in italics indicates the additions made by reissue.

ABSTRACT OF THE DISCLOSURE

Producing a semipermeable membrane of enhanced strength, useful in separation systems such as those based on osmosis or reverse osmosis, by casting such membrane from a solution comprising; a cellulosic derivative, for example, cellulose acetate, a flux promoter; a water miscible organic solvent; and from about 2% to about 50% pyridine by weight.

This application is a continuation-in-part of my application Ser. No. 614,398 filed Feb. 7, 1967, and now abandoned.

This invention relates to production of a semipermeable membrane, and more particularly a semipermeable membrane of improved characteristics useful in apparatus for separation processes such as osmosis or reverse osmosis.

In normal osmotic processes, a concentrated solution on one side of a semipermeable membrane will become diluted with a liquid extracted from a more dilute solution on the other side of the membrane.

Reverse osmosis is a useful process for separating salts and solutes from solutions. If high pressure is applied to a solution which is in contact with a suitably supported semipermeable membrane, purified solution will pass through the membrane while the initial solution will become correspondingly more concentrated with respect to the solute originally contained therein. Characteristics of the semipermeable membrane are most important. It must be selective, that is it must retain a solute and pass a solvent; and it must be capable of rapid transmission of solvent therethrough, termed in the art, "flux." Additionally the membrane must be strong to withstand stresses in manufacture and heat treatments, and in service under pressures which may range from 100 to 2000 pounds per square inch. Since a membrane will ordinarily be about 0.002 to 0.008 inch thick, in order to provide selectivity and flux, strength becomes a serious problem, and many membranes fail in service due to compacting, cracking and splitting, or other types of rupture. Membranes may fail during heat treatment, which is used to increase selectivity, because the cellulose acetate base shrinks on heating causing troublesome contraction in a membrane fixedly maintained in or on a frame or tubular support. Membranes produced according to this invention will be substantially stronger than previously produced semipermeable membranes.

Summarized briefly, this invention contemplates a method for producing a semipermeable membrane in which the membrane-forming composition or casting solution consists essentially of from about 15% to about 30% of a cellulosic derivative, from about 5% to about 30% of a flux promoter, from about 15% to about 60% of a water miscible organic solvent for the cellulosic derivative and from about 2% to about 50% pyridine, all percentages by weight. The so-produced membrane is particularly characterized by its transparent appearance and by improved tensile strength.

In general, the method of this invention relates to production of a semipermeable membrane by spreading a membrane forming composition or casting solution over a surface to produce a film of substantially uniform thickness. A doctor blade may be employed to produce a flat film on a suitable flat solid surface. Or, for example, a bob of diameter slightly small than the interior diameter of a casting tube may be drawn through such tube to spread membrane forming composition over the casting tube interior surface to form a tubular film. After the film has been formed it may be exposed to the atmosphere for a short time to permit evaporation of a portion of the organic solvent in the casting solution. This period of time may be from zero to several minutes and is thought to improve membrane quality by help to produce a desirable membrane surface.

Next the film is immersed in water, preferably at a temperature from 0° C. to 4° C. to accomplish gellation of the film and to remove water soluble casting solution constituents. These water soluble constituents will comprise flux promoter, organic solvent and all other water soluble or miscible ingredients so that only the actual film producing ingredient now remains. During removal of water soluble constituents by leaching with water, there are replaced by water which is absorbed in the film in amounts between about 25% to about 75% by weight. Thus the flux promoter and the organic solvent have been removed and the so-produced membrane is composed of the original film producing ingredient cellulose acetate, and water.

Such a membrane at this stage will be capable of passing liquid at a comparatively high rate, that is, it will be characterized by high flux. It will not, however, be capable of a high degree of salt rejection, that is it will not be very selective. To develop selectivity the membrane is heated, preferably while immersed in water, at a temperature from about 65° C. to about 95° C. for between 5 to about 30 minutes. This heat treatment or curing step increases the selectivity of the membrane with only slight loss of flux so that an operable semipermeable membrane may be produced which can effectively separate salts and other solids from solutions such as sea water and brackish water at practically high flow rates.

If desired, the membrane may be formed directly on a porous surface of a backing tube or other member as more particularly described and claimed in my application Ser. No. 565,761 filed July 18, 1966.

The membrane-forming composition or casting solution according to this invention comprises an intimate mixture of:

(a) a cellulosic derivative;
(b) a flux promoter;
(c) a water soluble organic solvent for the cellulose derivative; and
(d) pyridine.

The cellulosic derivative (a), useful in the practice of this invention, is a compound [having the general formula:

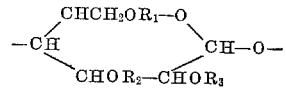

wherein $R_1$, $R_2$ and $R_3$ are members of the group consisting of $R_4$, and $CR_5O$ wherein $R_4$ is an alkyl group containing 1 to 8 carbon atoms and $R_5$ is an alkyl group containing 1 to 7 carbon atoms. Specific examples of such cellulosic derivatives are] *selected from the group consisting of* celulose acetate, cellulose acetate-butyrate, cellulose propionate and ethyl cellulose. Cellulose. Cellulose acetate is preferred because of its availability and low cost.

Cellulose acetate is available commercially as a number of different types depending on acetyl content. Cellulose acetates of acetyl content in the range from about 38% to 40%, preferably from 38.3% to 39.8%, and known as lacquer type cellulose acetates, are useful for membrane formation; and those particularly containing 39.3% and 39.8% acetyl content and which are readily commercially available are preferred.

The flux promoter, (b), is selected from the materials which enhance the flux properties of the membrane. These may be employed singly or in combination, and are often also solvents for cellulose acetate. Flux promoters also include swelling agents and pore-producing agents as they have been sometimes referred to. These materials will include water soluble liquid amides such as formamide, dimethyl formamide, methyl formamide and ethyl formamide. Inorganic salts such as perchlorates are also effective, magnesium perchlorate being preferred. It may be employed as an aqueous solution, conveniently from about 10% to 25% $Mg(ClO_4)_2$ and with a small amount of HCl, up to about 0.5% for stabilization. Sodium chloride, zinc chloride and hydrochloric acid solutions may also be used. Periodate, permanganate, fluoborate, thiocyanate, and fluosilicate salt solutions have also been proposed as pore producing agents. Formamide is a preferred swelling agent or flux promoter in the process of this invention. I have found glycerol to be effective as a flux promoter although its role is obscure. It appears to be neither a solvent nor a swelling agent for cellulose acetate yet in combination with pyridine substantially increases flux in a membrane.

The organic solvent (c), is selected from those which will dissolve the cellulosic derivative and are also water miscible. Such solvents include acetone, acetone:methanol, acetone:ethyl alcohol, methyl acetate, methyl ethyl ketone and p-dioxane. They may be employed singly or in combination. Acetone is preferred as the organic solvent in the practice of this invention.

The cellulosic derivative is present in amounts from about 15% to about 30%, the flux promoter is present in amounts from about 5% to about 30%, the organic solvent is present in amount from about 15% to about 60%, and pyridine from about 2% to about 50%, all percentages by weight. These percentages are critical to obtain the improved results described herein.

Less than 15% cellulosic derivative will produce a solution which is too thin and too low in content of the principal film-forming constituent. More than about 30% cellulosic derivative results in a solution which is too viscous to cast or be otherwise formed into a useful membrane shape.

The flux promoters should be present in amount at least about 5% to produce its characteristic desirable effect, that is to improve membrane flux. Above about 30% the effectiveness of this agent is reduced and in addition it may displace too much of the organic solvent necessary to provide an effective membrane casting solution.

The organic solvent must be present in the casting solution in amounts of at least about 15% to insure complete solution of the cellulosic derivative and also to provide (together with the flux promoter and pyridine) a solution of suitable viscosity for membrane production. More than about 60% organic solvent should not be used since, even with minimum amounts of swelling agent and pyridine, the solution will be too fluid and will lack necessary viscosity for efficient membrane formation.

Pyridine is not sufficiently effective in amount below about 2% to produce appreciable membrane strength increase. It should not be present in amount above about 50% for this particular application since its strengthening action is not appreciably increased by its presence in such amounts, it may displace an undesirable amount of the organic solvent, and it is relatively expensive.

Generally about 10% to 25% pyridine has been found to provide excellent strength increase without deleterious effect on other membrane properties. Above this, increased strength is obtained but often at the expense of some flux or selectivity. Amounts from about 2% to about 10% pyridine provide a smaller but still useful increase in strength and also seem to improve homogeneity of the membrane, although this effect is also not as marked as at higher pyridine percentages.

Preferably the casting solution components should be present in more restricted ranges to provide the best combination of selectivity, flux, and strength in the membrane. These preferred ranges are about 20% to 27.5% for the cellulosic derivative about 20% to 30% for the flux promoter, about 40% to 55% for the organic solvent, and about 10% to about 25% for pyridine, all percentages by weight.

Specifically when glycerol is used as a flux promoter it should preferably be present in amount between about 5% and 15% and the pyridine content should preferably be at the high end of its broad range, that is from about 30% to 50%. Under these conditions acetone will be present in amount at the lower end of its broad range, that is between about 15% to about 35%. These more restricted ranges provide better control of particularly the cellulosic derivative and organic solvent contents, to provide casting solutions of most desirable viscosity and which will produce membranes of best overall properties.

Materials used in producing membranes according to this invention should be of sufficient purity so that deleterious amounts of contaminants are avoided. Water in small amounts can be tolerated because it is soluble in the casting solution.

Solid impurities which may result in inclusions or discontinuities in the membrane are very harmful. Other foreign materials that may adversely affect membrane uniformity and homogeneity should not be present in deleterious amounts. Lacquer grade cellulose acetate has been found useful, and practical grade formamide is sufficiently pure. Reagent grade or pure acetone and pyridine can advantageously be employed; these reagents have been used in the examples described to provide closer control over membrane characteristics and comparative properties.

The following examples illustrate the practice of selected embodiments of this invention:

EXAMPLE 1

A casting solution was prepared consisting of the following ingredients in amounts to provide the indicated percentages by weight:

| | Percent |
|---|---|
| Cellulose acetate Eastman 398–3 | 25 |
| Formamide (practical grade) | 25 |
| Acetone (reagent grade) | 30 |
| Pyridine (reagent grade) | 20 |

The ingredients were mixed in a rotating jar mixer for 24 hours. Then the casting solution was spread over the surface of a flat glass plate using a straight edge doctor blade and side spacers 0.008 inch thick. After the film of casting solution had been formed the glass plate and film was immersed in water at 1° C. for a period of 90 minutes. The glass plate and film was then removed from the water bath and the film removed from the glass plate. The so-formed film was subsequently immersed in water at a temperature of 74° C. for a period of 10 minutes to accomplish heat treatment.

The so-produced heat treated membrane, 0.004 inch thick, was clear and transparent.

A specimen of the membrane was cut off for tensile testing. Ultimate tensile strength was 940 pounds per square inch determined at a constant load increase of 16 pounds per square inch per minute. Yield strength was 530 pounds per square inch, and total elongation to break was 33%.

A section of the membrane was tested for initial flux and selectivity in a laboratory test cell which comprised a porous stainless steel plate supporting the membrane, means for supplying impure feed water under pressure to the exposed surface of the membrane and means for collecting purified water passing through the membrane. Using brackish water feed of 4200 p.p.m. sodium chloride content and an operating pressure of 600 p.s.i., flux through the membrane was determined to be 22 gallons per square foot per day and selectivity, that is percentage of the feed water salt content rejected by the membrane, was 96.7%. A conductivity meter was used to determine salt content of both feed and product water.

Another membrane was produced by a procedure similar to that described in Example 1 but was cast from a solution containing no pyridine and composed of:

| | Percent |
|---|---|
| Cellulose acetate Eastman 398–3 | 25 |
| Formamide (practical grade) | 30 |
| Acetone (reagent grade) | 45 |

After casting and immersion in cold water it was heat treated at 78° C. The membrane appeared translucent. Strength test of this membrane showed ultimate tensile strength of 800 p.s.i. and yield strength of 530 p.s.i. Total elongation to break was 22%. Operating tests in the laboratory cell showed flux of 26 gal./sq. ft./day and selectivity of 94%.

It is seen that the membrane cast from the pyridine-containing solution was stronger, that it had higher ultimate strength and also greater elongation before breaking. The flux was slightly less and the selectivity of the pyridine membrane was greater, although these could be considered substantially equivalent since a decrease in selectivity is often accompanied by an increase in flux. Results are tabulated in Table 1 below, for ready comparison.

TABLE 1

| Membrane casting solution composition | Ultimate tensile strength, p.s.i. | Yield strength, p.s.i. | Total elongated, percent | Flux gal./sq. ft./day | Selectivity, percent |
|---|---|---|---|---|---|
| CA, Ac, formamide, pyridine | 940 | 530 | 33 | 22 | 96.7 |
| CA, Ac, formamide | 800 | 530 | 22 | 26 | 94 |

EXAMPLE 2

A membrane was produced by a procedure similar to that described in Example 1, but using aqueous magnesium perchlorate as a swelling agent or flux promoter in place of formamide, and the film was cast at −10° C. The casting solution had the following composition:

| | Percent |
|---|---|
| Cellulose acetate Eastman 398–3 | 23.1 |
| $Mg(ClO_4)_2$, aqueous 22% | 7.6 |
| Acetone (reagent grade) | 56.0 |
| Pyridine (reagent grade) | 13.2 |

The membrane was tested for strength in the unheated condition under the same test conditions described for Example 1. Ultimate tensile strength was determined to be 610 p.s.i., yield strength was 293 p.s.i. and total elongation was 21.4%.

Then a section of the membrane was heat treated by immersion in water at 76° C. for 10 minutes and subsequently tested for flux and selectivity. Flux was found to be 23.1 gal./sq. ft./day and selectivity 85.5%, on feed of 4100 p.p.m. sodium chloride solution at 600 p.s.i. The membrane was clear and transparent.

Another membrane was produced by a procedure similar to that described for Example 2 except that the casting solution contained no pyridine and was composed of:

| | Percent |
|---|---|
| Cellulose acetate Eastman 398–3 | 23.1 |
| $Mg(ClO_4)_2$, aqueous 22% solution | 7.7 |
| Acetone (reagent grade) | 69.2 |

This membrane, like that of Example 2 was tested for strength in the unheated condition and showed ultimate tensile strength of 500 p.s.i., yield strength of 240 p.s.i. and total elongation of 25.5%. A section of the membrane was heat treated at 78° C. and tested for operating characteristics as before. These tests showed flux of 16 gal./sq. ft./day and selectivity of 96%. The membrane was cloudy or milky in appearance and was translucent.

It is seen that the membrane cast from the pyridine-containing solution again is stronger (22% greater ultimate strength) than that made without pyridine. Selectivity in this particular test was lower but flux was much higher. Results are tabulated in Table 2 below for ready comparison.

TABLE 2

| Membrane casting solution composition | Ultimate tensile strength, p.s.i. | Yield strength, p.s.i. | Elongated, percent | Flux gal./sq. ft./day | Selectivity, percent |
|---|---|---|---|---|---|
| CA, $Mg(ClO_4)_2$ Ac, Pyridine | 610 | 203 | 21.4 | 23.1 | 85.5 |
| CA, $Mg(ClO_4)_2$ Ac | 500 | 240 | 25.5 | 15.5 | 96.0 |

EXAMPLE 3

Two membranes were produced by a procedure similar to that described in Example 1, but using glycerol in combination with pyridine as a flux promoter, and drying for ½ minute after casting. The casting solution had the following composition:

| | A, percent | B, percent |
|---|---|---|
| Cellulose acetate Eastman 398-3 | 24.2 | 24.5 |
| Acetone (reagent grade) | 48.3 | 24.0 |
| Glycerol (reagent grade) | 6.8 | 6.5 |
| Pyridine (reagent grade) | 20.7 | 4.0 |

The membranes were heat treated by immersion in water at 78° C. for 10 minutes and then specimens were cut and tested for flux and selectivity using a 4900 p.p.m. NaCl solution as feed; and for strength, as previously described. Table 3, following, shows the results obtained.

TABLE 3

| Membrane casting solution composition | Ultimate tensile strength, p.s.i. | Yield strength, p.s.i. | Elongated, percent | Flux gal./sq. ft./day | Selectivity, percent |
|---|---|---|---|---|---|
| A (20.7% pyridine) | 796 | 630 | 14 | 22.9 | 94.2 |
| B (45% pyridine) | 980 | 534 | 36 | 15.3 | 97.0 |

In the results from formulation A the ultimate strength has not been improved over the formamide formulation used for comparison in Example 1, and the total elongation is lower. Yield strength is, however, higher. In operating characteristics the selectivity is about the same while flux is slightly lower. The results from formulation B show substantially increased tensile strength, about the same yield strength and substantially increased total elongation compared again to the formamide comparison of Example 1. Clearly increase in strength (ultimate T.S. and total elongation) has been achieved by raising the pyridine content from 20.7% to 45%. The total area under the stress-strain curve has been more than doubled indicating an appreciable increase in toughness. Flux is somewhat lower than standard tests but selectivity is high at 97%.

The membrane from formulation A was slightly milky in appearance while that from formulation B was completely transparent.

From the test described in this example, it would appear that more pyridine is required when glycerol is employed as a flux promoter. This, however, is reasonable since I have found that glycerol acts as a flux promoter when used in combination with pyridine. A casting solution made from only cellulose acetate, glycerol and acetone is non-homogeneous and will not produce acceptable membranes. A solution made from only cellulose acetate, acetone and pyridine will produce a membrane but having a very low flux. However, when glycerol and pyridine are used in combination improved flux as well as a strong membrane results. From the relatively large amount of pyridine required in combination with glycerol, it is postulated that some proportion may act as a coupler or to promote solubility of the glycerol, and an additional percentage results in the strength increase as hereinbefore described.

Examples 1, 2 and 3 illustrate the formulation of solutions used in production of flat membranes. Membranes of tubular shape may also be produced, and the advantages accruing from employment of pyridine in the casting solution will be obtained. Additionally, membranes made from pyridine-containing casting solutions, being stronger, are advantageously employed in treating more concentrated solutions such as sea water. The greater strength of the membrane will enable it to withstand the more severe operating conditions, particularly pressure which may be as high as 1000 to 2000 p.s.i.

A membrane produced using pyridine for its strengthening effect is particularly useful for desalting sea water. Such a membrane will have high strength required for assembly and use in high pressure apparatus and will show excellent operating characteristics. Tubular membranes are desirable for many reverse osmosis applications since desirable turbulence and flow can be obtained by passage of liquid therethrough resulting in elimination, or substantial reduction of boundary layer effects. The tubular membrane cast from a pyridine-containing solution is typically transparent, containing about 25% to 75% water and of cellulose accetate of acetyl content from about 38% to about 40% and preferably about 39.8%. When to be used in tubular configuration the membrane is preferably formed of cellulose acetate of somewhat higher viscosity than that used for flat membranes and this viscosity should be about 6 to about 30 seconds measured according to ASTM test D-1343-56.

The following illustrates production of a tubular membrane using a casting solution containing pyridine.

EXAMPLE 4

A casting solution was prepared consisting of the following ingredients in amounts to provide the indicated percentages by weight:

| | Percent |
|---|---|
| Cellulose acetate Eastman 398-10 | 25 |
| Formamide (practical grade) | 25 |
| Acetone (reagent grade) | 30 |
| Pyridine (reagent grade) | 20 |

These ingredients were thoroughly mixed in a rotating jar mixer for 24 hours to form a casting solution.

Apparatus for production of tubular membrane comprised a smooth surface steel tube of inside diameter about ½ inch. A bob of diameter about 0.03 inch less than the inside diameter of the tube was suspended at the lower end of a long, somewhat flexible shaft supported at its top over a deep water-filled container. The tube was placed around the bob and its shaft, and raised clear of the bob. A container of casting solution was then raised under the bob to immerse it and a short length of its supporting shaft in the solution. The tube was then lowered to trap solution around the top of the bob, and the container of casting solution was then removed. The steel tube was allowed to fall freely while the bob remained stationary to coat the inside of the tube with a film of casting solution about 0.015 inch thick. The bob automatically centered itself in the tube as the tube dropped so that a uniform film of casting solution was spread over the tube interior surface. As the tube became coated on its inside with casting solution it dropped into the deep water-filled container underneath, the water in this container being at a temperature of 2° C. It will be noted that as the tube dropped and its inside film was formed, this film was progressively and almost instantaneously immersed in water so that uniform spreading and solvent evaporation time was obtained over the length of the membrane tube. The tube with membrane film inside was allowed to remain in the water in the container for one hour to leach out the formamide, acetone and pyridine. The membrane, which now was formed as an elongated tube of completely transparent gel of cellulose acetate and water, was then removed from the water and the tube.

The so-produced membrane was heat treated by first wrapping with nylon fabric, then the wrapped membrane was inserted in a stainless steel backing tube having holes drilled at intervals in its wall to provide porosity. The tube and contained membrane was assembled with ends and connections to provide a single tube reserve osmosis system. Hot water at a temperature of 90° C. was circulated through the membrane tube at a pressure of 10 p.s.i. for a period of 15 minutes. Subsequently the membrane in its steel backing tube was tested by pumping sea water from a beach well (32,000 p.p.m. total dissolved solids) into one end of the membrane tube under pressure and controlling the outflow from the other end of the membrane tube by means of a back pressure regulator valve. Solution was maintained under pressure at 1250 p.s.i. in the membrane tube.

Product water flowing through the backing tube pores was collected and analyzed for salt content. Product water passed in a 15 minute time period was measured. After operating tests had been run, a section of the membrane was cut for tensile strength determination. Results of operating tests and tensile strength tests are tabulated below:

TABLE 4

Tubular pyridine membrane

| | |
|---|---|
| Feed ,p.p.m. salt water | 32,000 |
| Pressure, p.s.i. | 1,250 |
| Flux, gal./sq. ft./day | 10 |
| Selectivity, percent | 97 |
| Ultimate tensile strength, p.s.i. | 1,600 |
| Yield strength, p.s.i. | 850 |
| Total elongation, percent | 32 |

Similar tests using a membrane produced from the casting solution previously described in comparing the results in Example 1 and containing no pyridine and also operated as in Example 3, showed comparable ultimate tensile strength of 1140 p.s.i., yield strength of 570 p.s.i., and elongation of 29%. The ultimate tensile strength has been increased by 40% by use of pyridine in the casing solution.

A significant effect on membrane properties resulting from use of pyridine in the casting solution is shown by comparison of strength and elongation in the un-heat treated, heat treated, and used under operating pressure conditions. Table 5, below, compares strength and elongation for similar pyridine type memberanes produced and tested according to the method described in Example 4, and in condition as shown.

TABLE 5

| Tubular membrane condition | Ultimate strength, tensile p.s.i. | Yield strength, p.s.i. | Percent elongation |
|---|---|---|---|
| Un-heat treated | 980 | 410 | 39 |
| Heat treated at 90° C | 940 | 680 | 25 |
| Heat treated at 90° C., and run at 1,250 p.s.i., sea water feed | 1,600 | 850 | 32 |

It will be seen from Table 5 that the membrane, produced from a pyridine-containing casting solution, showed substantially enhanced tensile strength after casting, heat treating, and use under operating pressure.

While Example 4 shows strength and operating characteristics obtained with a membrane treated and cured at 90° C., good flux (product rate) and selectivity (salt rejection) can be obtained by heating at somewhat lower temperatures. Table 6, below, shows performance of membranes prepared from casting solutions containing pyridine and used for purifying brackish water, 5000 p.p.m. salt content. Membranes were tested in a laboratory cell. In certain of these tests, solvent evaporation for a designated evaporation period was allowed to take place before the film was immersed in water.

TABLE 6

| Casting solution composition (percent by weight) [1] | | | | Evap. period, min. | Heat treat., ° C. | Flux, gal./sq. ft./day | Selectivity, percent |
|---|---|---|---|---|---|---|---|
| CA | P | F | Ac | | | | |
| 25 | 15 | 30 | 30 | ½ | 78 | 17.7 | 97 |
| 25 | 15 | 30 | 30 | ½ | 74 | 20.8 | 94 |
| 25 | 15 | 30 | 30 | ¼ | 78 | 19.2 | 97 |
| 25 | 15 | 30 | 30 | ¼ | 74 | 24.0 | 93 |
| 25 | 15 | 30 | 30 | 0 | 74 | 22.6 | 95 |
| 25 | 20 | 25 | 30 | ½ | 78 | 15.1 | 97 |
| 25 | 20 | 25 | 30 | ½ | 74 | 18.2 | 96 |
| 25 | 20 | 25 | 30 | ¼ | 78 | 18.0 | 97 |
| 25 | 20 | 25 | 30 | ¼ | 74 | 21.8 | 95 |
| 25 | 20 | 25 | 30 | 0 | 74 | 28.0 | 94 |
| 25 | 20 | 25 | 30 | 1.0 | 70 | 28.0 | 88 |
| 25 | 20 | 25 | 30 | 1.0 | 74 | 18.0 | 93 |
| 25 | 20 | 25 | 30 | ¾ | 74 | 23.4 | 94 |

[1] CA, Cellulose Acetate; P, Pyridine; F, Foramide; Ac, Acetone.

It is important to note that the membrane ready for use does not contain the solvent, flux promoter, or the pyridine used in the casting solution. These materials are water soluble and are leached out of the membrane when it is immersed in water after casting. The actual effect on membrane structure caused by the presence of pyridine is not precisely known, but transparency and increased strength with at least acceptable flux and selectivity are the important results and characteristics imparted thereby.

In this specification, all references to percentage composition of casting solutions are percentages by weight. All references to pounds per square inch (p.s.i.) in describing membrane operating pressures are pounds per square inch gauge. Pounds per square inch designations in tensile tests are absolute.

The process of this invention produces a membrane which is substantially transparent while containing from about 25% to 75% water, and is further characterized by being up to about 40% stronger than a membrane produced from a casting solution similar to that hereinbefore described but containing no pyridine. Membranes containing a similar amount of water and produced from solutions consisting of the cellulosic derivative, flux promoter and solvent will generally be translucent or slightly milky in appearance. This translucence is thought to be caused by the presence of minute globules of water distributed throughout the cellulosic derivative matrix. The presence of these water particles is the result of replacement of the flux promoter and solvent when the membrane film as first formed is immersed in water as described. Apparently the casting solution constituents other than the cellulosic derivative are leached out and removed and the membrane film then absorbs water to an extent to amount to between about 25% to 75% of the total membrane weight. Casting solution ingredients heretofore employed have resulted in a water distribution in the membrane which is responsible for the typical non-transparent appearance. In the case of membranes produced according to this invention, however, water is present in the membrane in similar amount, that is about 25% to 70%, but it is apparently much more finely dispersed resulting in a more homogeneous and a more transparent membrane. Under some conditions membranes produced from pyridine-containing casting solutions will be brilliantly clear and completely transparent. In other cases the transparency will not be so marked but membranes produced according to this invention will in any event be substantially more transparent than the translucent of milky appearing membranes made without pyridine. It appears that the nature of the dispersed water phase has been substantially altered by the presence of pyridine in the casting solution; at least the appearance of the membrane has been materially changed, and its strength properties have been improved.

I claim:

1. A method for producing a semipermeable membrane in which a membrane-forming composition is cast to produce a film of substantially uniform thickness and the so-produced film is immersed in water to remove water soluble constituents wherein the improvement, to provide a membrane of improved strength, comprises employing as the membrane-forming composition a casting solution comprising by weight:

(a) a cellulosic derivative [having the formula,

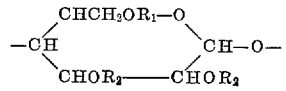

wherein $R_1$, $R_2$, and $R_3$ are members of a group consisting of $R_4$, and $CR_5O$ wherein $R_4$ is an alkyl group containing 1 to 8 carbon atoms and $R_5$ is an alkyl group containing 1 to 7 carbon atoms, in amount from about 15% to about 30%] *selected from the group consisting of cellulose acetate, cellulose acetate butyrate, cellulose propionate, and ethyl cellulose,*

(b) a flux promoter selected from the group consisting of formamide, dimethyl formamide, methyl formamide, ethyl formamide, glycerol, magnesium perchlorate, sodium chloride, zinc chloride and hydrochloric acid in amount from about 5% to about 30%;

(c) a water miscible organic solvent selected from the group consisting of acetone, acetone; methanol, acetone; ethyl alcohol, methyl acetate, methyl ethyl ketone, p-dioxane and mixtures thereof for the cellulosic derivative in amount of from about 15% to about 60%; and, (d) pyridine in amount from about 2% to about 50%.

2. A method according to claim 1 in which the cellulosic derivative in (a) is cellulose acetate of acetyl content from about 38% to about 40% by weight.

3. A method according to claim 1 in which the flux promoter in (b) is formamide.

4. A method according to claim 1 in which the flux promoter in (b) is glycerol.

5. A method according to claim 1 in which the organic solvent in (c) is acetone.

6. A method according to claim 1, in which the membrane-forming composition comprises by weight:

(a) from about 20% to about 27.5% of cellulose acetate of acetyl content from about 38% to 40%;
(b) from about 20% to about 30% of formamide;
(c) from about 20% to about 50% of acetone; and,
(d) from about 10% to about 25% of pyridine.

7. A method according to claim 1 in which the membrane forming composition comprises by weight:

(a) from about 20% to about 27.5% of cellulose acetate content from about 38% to 40%;
(b) from about 5% to about 35% of glycerol;
(c) from about 15% to about 35% of acetone; and,
(d) from about 30% to about 50% of pyridine.

8. A method according to claim 1 in which the membrane after immersion in water is heat treated at a temperature between 65° C. and 95° C.

9. A method according to claim 1 in which the membrane after immersion in water is heat treated at a temperature between 65° C. and 95° C. for a period between 5 minutes and about 30 minutes.

References Cited

The following references, cited by the Examiner, are of record in the patented file of this patent or the original patent.

UNITED STATES PATENTS

| | | | |
|---|---|---|---|
| 3,026,571 | 3/1962 | Maier | 264—53 X |
| 3,412,184 | 11/1968 | Sharples | 264—41 X |

OTHER REFERENCES

Manjikian, S.: "Improvement in Fabrication Techniques for Reverse Osmosis Desalination Membranes," First International Symposium on Water Desalination, Washington, D.C., Oct. 3–9, 1965, pp. 1–3.

U.S. Office of Saline Water, "Reverse Osmosis for Water Desalination," by H. K. Lonsdale, General Atomic Div. of General Dynamics, San Diego, Calif., Research and Development Report, No. 11, May 24, 1964, pp. 99, 104.

U.S. Office of Saline Water, "Reverse Osmosis for Water Desalination," by U. Merten, General Dynamics Corp., General Atomic Div., San Diego, Calif., Research and Development Report, No. 208, September 1966, pp. 67–69, 72–75.

El Ford, W. J.: "Principles Governing the Preparation of Membranes Having Graded Properties; the Properties of Gradocol Membranes as Ultra-Filters," in Transactions of the Faraday Society, vol. 33, pp. 109–1106 (1937).

Doolittle, Arthur K.: "The Technology of Solvents and Plasticizers," New York, John Wiley & Sons, 1954, p. 739.

U.S. Cl. X.R.

106—178, 186, 187, 189; 210—500; 264—216, 49, 331